United States Patent
Son (10) Patent No.: US 11,681,127 B2
(45) Date of Patent: Jun. 20, 2023

(54) OPTICAL IMAGING SYSTEM

(71) Applicant: SAMSUNG ELECTRO-MECHANICS CO., LTD., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/565,685

(22) Filed: Dec. 30, 2021

(65) Prior Publication Data

US 2022/0121015 A1 Apr. 21, 2022

Related U.S. Application Data

(63) Continuation of application No. 16/421,680, filed on May 24, 2019, now Pat. No. 11,237,363, which is a continuation of application No. 15/585,229, filed on May 3, 2017, now Pat. No. 10,345,556.

(30) Foreign Application Priority Data

Dec. 28, 2016 (KR) .................. 10-2016-0181233

(51) Int. Cl.
*G02B 9/62* (2006.01)
*G02B 13/18* (2006.01)
*G02B 13/00* (2006.01)
*G02B 5/20* (2006.01)

(52) U.S. Cl.
CPC ......... *G02B 13/0045* (2013.01); *G02B 5/208* (2013.01); *G02B 9/62* (2013.01); *G02B 13/18* (2013.01)

(58) Field of Classification Search
CPC ...... G02B 13/0045; G02B 9/62; G02B 13/04; G02B 5/208
USPC ................................ 359/713, 752, 756–762
See application file for complete search history.

(56) References Cited

U.S. PATENT DOCUMENTS

| | | | |
|---|---|---|---|
| 8,310,767 B2 | 11/2012 | Huang et al. |
| 8,717,685 B2 | 5/2014 | Tsai et al. |
| 9,435,983 B2 | 9/2016 | Liao et al. |
| 9,759,896 B1 | 9/2017 | Tang et al. |
| 2012/0194726 A1 | 8/2012 | Huang et al. |
| 2013/0329306 A1 | 12/2013 | Tsai et al. |
| 2015/0109684 A1 | 4/2015 | Son |

(Continued)

FOREIGN PATENT DOCUMENTS

| CN | 201974571 U | 9/2011 |
|---|---|---|
| CN | 102621664 A | 8/2012 |

(Continued)

OTHER PUBLICATIONS

Gross et al, Handbook of Optical Systems: Aberration Theory and Correction of Optical Systems, 2007, Wiley-VCH, vol. 3.

(Continued)

*Primary Examiner* — William Choi
(74) *Attorney, Agent, or Firm* — NSIP Law (57) ABSTRACT

An optical imaging system includes a first lens, a second lens, a third lens, a fourth lens, a fifth lens, and a sixth lens sequentially arranged from an object side to an imaging plane. An angle of view of the optical system is 82 degrees or more. A constant indicating brightness of the optical system, F-number, is less than 1.8.

14 Claims, 12 Drawing Sheets

(56) References Cited

U.S. PATENT DOCUMENTS

| | | |
|---|---|---|
| 2015/0138431 A1 | 5/2015 | Shin et al. |
| 2015/0153546 A1 | 6/2015 | Tang et al. |
| 2015/0370042 A1 | 12/2015 | Chen et al. |
| 2016/0033744 A1 | 2/2016 | Tsai et al. |
| 2016/0085052 A1 | 3/2016 | Park |
| 2016/0131873 A1 | 5/2016 | Tang et al. |
| 2016/0139368 A1 | 5/2016 | You |
| 2016/0161719 A1 | 6/2016 | Son |
| 2016/0178871 A1 | 6/2016 | You |
| 2016/0341930 A1* | 11/2016 | Liu .................... G02B 13/0045 |
| 2017/0153419 A1 | 6/2017 | Hsieh et al. |
| 2017/0176719 A1 | 6/2017 | Tang et al. |
| 2017/0192200 A1 | 7/2017 | Hsieh et al. |
| 2017/0219803 A1 | 8/2017 | Lee et al. |
| 2017/0336604 A1 | 11/2017 | Hsu et al. |
| 2018/0120539 A1 | 5/2018 | Gong et al. |
| 2018/0180851 A1 | 6/2018 | Son |
| 2018/0188483 A1 | 7/2018 | Hsieh et al. |

FOREIGN PATENT DOCUMENTS

| | | |
|---|---|---|
| CN | 202710833 U | 1/2013 |
| CN | 103472573 A | 12/2013 |
| CN | 104570279 A | 4/2015 |
| CN | 104656232 A | 5/2015 |
| CN | 104678537 A | 6/2015 |
| CN | 105242374 A | 1/2016 |
| CN | 105319679 A | 2/2016 |
| CN | 105319682 A | 2/2016 |
| CN | 105676419 A | 6/2016 |
| CN | 105717611 A | 6/2016 |
| CN | 105892023 A | 8/2016 |
| CN | 105911675 A | 8/2016 |
| CN | 106154486 A | 11/2016 |
| CN | 106772932 A | 5/2017 |
| CN | 107015345 A | 8/2017 |
| CN | 207164342 U | 3/2018 |
| JP | 2006-243092 A | 9/2006 |
| JP | 6051321 B1 | 12/2016 |
| KR | 10-1504035 B1 | 3/2015 |
| KR | 10-2016-0058593 A | 5/2016 |
| KR | 10-1834728 B1 | 3/2018 |

OTHER PUBLICATIONS

Korean Office Action dated Apr. 23, 2018, in corresponding Korean Application No. 10-2016-0181233 (7 pages in English, 5 pages in Korean).

Chinese Office Action dated Dec. 4, 2019 in counterpart Chinese Patent Application No. 201710541515.6 (11 pages in English and 8 pages in Chinese).

Chinese Office Action dated Oct. 13, 2021, in counterpart Chinese Patent Application No. 202010523571.9 (11 pages in English and 11 pages in Chinese).

* cited by examiner

| SURFACE NUMBER | RADIUS OF CURVATURE | THICKNESS ,DISTANCE | REFRACTIVE INDEX | ABBE NUMBER | EFFECTIVE RADIUS |
|---|---|---|---|---|---|
| S1 | 1.655 | 0.643 | 1.546 | 56.114 | 1.110 |
| S2 | 14.511 | 0.025 | | | 1.074 |
| S3 | 4.456 | 0.230 | 1.667 | 20.353 | 1.002 |
| S4 | 2.400 | 0.220 | | | 0.893 |
| S5(STOP) | 8.322 | 0.381 | 1.546 | 56.114 | 0.918 |
| S6 | 42.538 | 0.322 | | | 1.004 |
| S7 | 7.861 | 0.293 | 1.656 | 21.525 | 1.092 |
| S8 | 5.039 | 0.270 | | | 1.470 |
| S9 | -11.899 | 0.488 | 1.656 | 21.525 | 1.491 |
| S10 | -22.075 | 0.030 | | | 1.729 |
| S11 | 1.682 | 0.793 | 1.536 | 55.656 | 1.851 |
| S12 | 1.461 | 0.219 | | | 2.339 |
| S13 | | 0.210 | 1.518 | 64.166 | 2.634 |
| S14 | | 0.671 | | | 2.718 |
| Image | | | | | 3.728 |

FIG. 3

|   | S1 | S2 | S3 | S4 | S5 | S6 | S7 | S8 | S9 | S10 | S11 | S12 |
|---|---|---|---|---|---|---|---|---|---|---|---|---|
| R | 1.654788 | 14.51119 | 4.455776 | 2.400024 | 8.322135 | 42.53828 | 7.860992 | 5.039276 | -11.8994 | -22.0747 | 1.681645 | 1.46123 |
| K | -0.3723 | 0.999541 | 0.353796 | 0.181179 | -0.99769 | -1 | 0.220163 | -27.5775 | 23.20306 | -49.9473 | -2.111134 | -0.85973 |
| A | 0.026114 | -0.02738 | -0.03363 | 0.067921 | 0.013425 | -0.04296 | -0.19774 | -0.07803 | 0.343692 | 0.116254 | -0.337 | -0.2651 |
| B | -0.19986 | -0.12017 | -0.00137 | -0.62477 | -0.24163 | 0.045213 | 0.103677 | -0.17621 | -0.5838 | -0.10627 | 0.194329 | 0.134592 |
| C | 0.748115 | 0.341805 | 0.048645 | 3.14051 | 1.130251 | -0.29544 | -0.27791 | 0.277888 | 0.474465 | 0.019974 | -0.08116 | -0.0591 |
| D | -1.70102 | -0.54196 | -0.13849 | -9.2063 | -3.47382 | 1.277456 | 1.06049 | -0.16813 | -0.22061 | 0.010353 | 0.026093 | 0.018161 |
| E | 2.275098 | 0.570892 | 0.66387 | 16.0818 | 6.050724 | -3.45275 | -2.27634 | -0.03112 | 0.009933 | -0.00913 | -0.00574 | -0.00359 |
| F | -1.81311 | -0.46162 | -1.23966 | -16.124 | -5.95826 | 5.020732 | 2.501775 | 0.092781 | 0.036749 | 0.003258 | 0.000783 | 0.00043 |
| G | 0.788434 | 0.256318 | 1.025597 | 8.367919 | 2.958085 | -3.72662 | -1.40101 | -0.04121 | -0.01368 | -0.00057 | -5.90E-05 | -2.80E-05 |
| H | -0.14448 | -0.06653 | -0.31895 | -1.63046 | -0.45743 | 1.132485 | 0.315587 | 0.005823 | 0.001509 | 3.96E-05 | 1.87E-06 | 7.57E-07 |

| SURFACE NUMBER | RADIUS OF CURVATURE | THICKNESS, DISTANCE | REFRACTIVE INDEX | ABBE NUMBER | EFFECTIVE RADIUS |
|---|---|---|---|---|---|
| S1 | 1.634 | 0.643 | 1.546 | 56.114 | 1.100 |
| S2 | 18.332 | 0.025 | | | 1.074 |
| S3 | 4.913 | 0.230 | 1.667 | 20.353 | 1.006 |
| S4 | 2.500 | 0.220 | | | 0.895 |
| S5(STOP) | 16.322 | 0.381 | 1.546 | 56.114 | 0.922 |
| S6 | -22.538 | 0.322 | | | 1.013 |
| S7 | 12.349 | 0.293 | 1.656 | 21.525 | 1.095 |
| S8 | 5.556 | 0.270 | | | 1.492 |
| S9 | -10.173 | 0.488 | 1.656 | 21.525 | 1.631 |
| S10 | -7.353 | 0.030 | | | 2.011 |
| S11 | 1.996 | 0.793 | 1.536 | 55.656 | 2.437 |
| S12 | 1.497 | 0.219 | | | 2.713 |
| S13 | | 0.210 | 1.518 | 64.166 | 3.044 |
| S14 | | 0.671 | | | 3.113 |
| Image | | | | | 3.628 |

FIG. 7

|   | S1 | S2 | S3 | S4 | S5 | S6 | S7 | S8 | S9 | S10 | S11 | S12 |
|---|---|---|---|---|---|---|---|---|---|---|---|---|
| R | 1.633879 | 18.33215 | 4.912522 | 2.5 | 16.32225 | -22.5375 | 12.34915 | 5.555596 | -10.1727 | -7.35276 | 1.995687 | 1.497167 |
| K | -0.40384 | 0.999541 | 1 | 0.024618 | -0.99769 | 1 | 0.220163 | -27.5775 | 23.20306 | -49.9473 | -1.81213 | -0.90879 |
| A | 0.007291 | -0.02045 | 0.005928 | 0.026626 | -0.0112 | -0.0269 | -0.2098 | -0.09967 | 0.321211 | 0.125775 | -0.30008 | -0.25252 |
| B | -0.06795 | -0.20974 | -0.3078 | -0.05976 | 0.168608 | 0.042866 | 0.072126 | -0.17059 | -0.49521 | -0.07833 | 0.16537 | 0.132706 |
| C | 0.257017 | 0.651752 | 1.097205 | -0.43797 | -1.17578 | -0.30263 | 0.052517 | 0.321088 | 0.341397 | -0.02315 | -0.07009 | -0.05989 |
| D | -0.62407 | -1.02501 | -1.92142 | 3.346199 | 3.527872 | 1.271444 | -0.0254 | -0.2355 | -0.09934 | 0.037911 | 0.023564 | 0.018669 |
| E | 0.831885 | 0.869235 | 2.044871 | -9.85086 | -6.75723 | -3.44837 | -0.37762 | 0.006579 | -0.06393 | -0.01926 | -0.00536 | -0.0037 |
| F | -0.65634 | -0.39057 | -1.28321 | 15.32609 | 8.183795 | 5.020732 | 0.5 | 0.092402 | 0.065479 | 0.005565 | 0.000742 | 0.000437 |
| G | 0.275969 | 0.076512 | 0.451053 | -12.4298 | -5.88278 | -3.72662 | -0.31128 | -0.04712 | -0.01989 | -0.00088 | -5.50E-05 | -2.78E-05 |
| H | -0.04802 | -0.00292 | -0.07335 | 4.178055 | 1.98227 | 1.132485 | 0.073828 | 0.007129 | 0.002063 | 5.71E-05 | 1.77E-06 | 7.30E-07 |

| SURFACE NUMBER | RADIUS OF CURVATURE | THICKNESS ,DISTANCE | REFRACTIVE INDEX | ABBE NUMBER | EFFECTIVE RADIUS |
|---|---|---|---|---|---|
| S1 | 1.646 | 0.629 | 1.546 | 56.114 | 1.100 |
| S2 | 18.352 | 0.025 | | | 1.074 |
| S3 | 4.969 | 0.230 | 1.667 | 20.353 | 1.009 |
| S4 | 2.562 | 0.253 | | | 0.900 |
| S5(STOP) | 18.033 | 0.393 | 1.546 | 56.114 | 0.922 |
| S6 | -21.001 | 0.250 | | | 1.013 |
| S7 | 11.630 | 0.280 | 1.656 | 20.353 | 1.110 |
| S8 | 5.343 | 0.282 | | | 1.492 |
| S9 | -10.290 | 0.499 | 1.656 | 20.353 | 1.697 |
| S10 | -7.281 | 0.030 | | | 2.053 |
| S11 | 2.007 | 0.837 | 1.536 | 55.656 | 2.549 |
| S12 | 1.495 | 0.227 | | | 2.848 |
| S13 | | 0.210 | 1.518 | 64.166 | 3.216 |
| S14 | | 0.680 | | | 3.285 |
| Image | | | | | 3.728 |

FIG. 11

|   | S1 | S2 | S3 | S4 | S5 | S6 | S7 | S8 | S9 | S10 | S11 | S12 |
|---|---|---|---|---|---|---|---|---|---|---|---|---|
| R | 1.646303 | 18.35211 | 4.968714 | 2.561929 | 18.03321 | -21.0013 | 11.63039 | 5.342791 | -10.2897 | -7.28108 | 2.007078 | 1.495202 |
| K | -0.40432 | 0.999541 | 1 | 0.034212 | -0.99769 | 1 | 0.220163 | -27.5775 | 23.20306 | -49.9473 | -1.78342 | -0.9186 |
| A | 0.010197 | -0.0213 | 0.003346 | 0.023986 | -0.01409 | -0.02817 | -0.21278 | -0.10049 | 0.315431 | 0.123579 | -0.29462 | -0.24915 |
| B | -0.12005 | -0.20447 | -0.27874 | -0.05741 | 0.190912 | 0.041219 | 0.093537 | -0.16471 | -0.47471 | -0.07549 | 0.155732 | 0.130392 |
| C | 0.565497 | 0.640307 | 0.992897 | -0.27569 | -1.29952 | -0.3044 | -0.08371 | 0.312704 | 0.309929 | -0.02204 | -0.06246 | -0.05848 |
| D | -1.53201 | -1.01245 | -1.73761 | 2.219982 | 3.758139 | 1.271227 | 0.438148 | -0.23169 | -0.06704 | 0.034956 | 0.02035 | 0.01804 |
| E | 2.311292 | 0.873739 | 1.878273 | -6.33967 | -6.42735 | -3.44837 | -1.2107 | 0.008693 | -0.08574 | -0.01752 | -0.00459 | -0.00352 |
| F | -2.0111 | -0.41887 | -1.2435 | 9.479756 | 6.407314 | 5.020732 | 1.451041 | 0.089084 | 0.074172 | 0.005071 | 0.000635 | 0.000409 |
| G | 0.928648 | 0.105052 | 0.494941 | -7.38206 | -3.54727 | -3.72662 | -0.85705 | -0.04569 | -0.02171 | -0.00081 | -4.81E-05 | -2.56E-05 |
| H | -0.17663 | -0.01229 | -0.09754 | 2.404328 | 0.943514 | 1.132485 | 0.204212 | 0.006921 | 0.002219 | 5.30E-05 | 1.52E-06 | 6.60E-07 |

FIG. 12

OPTICAL IMAGING SYSTEM

CROSS-REFERENCE TO RELATED APPLICATION(S)

This application is a continuation of U.S. patent application Ser. No. 16/421,680, filed on May 24, 2019, which is a continuation of U.S. patent application Ser. No. 15/585,229, filed on May 3, 2017, now U.S. Pat. No. 10,345,556, which claims the benefit under 35 U.S.C. § 119(a) of Korean Patent Application No. 10-2016-0181233 filed on Dec. 28, 2016 in the Korean Intellectual Property Office, the entire disclosures of which are incorporated herein by reference for all purposes.

BACKGROUND

1. Field

The following description relates to an optical imaging system.

2. Description of Related Art

In mobile terminals, camera modules have come to be provided as a standard component, enabling video calls and image capture. In addition, as the functionality of camera modules in portable terminals has gradually increased, demand for high-resolution, high-performance camera modules in portable terminals has also increased. However, because portable terminals are becoming miniaturized and lightweight, limitations in implementing high-resolution and high-performance camera modules have been encountered.

In order to implement miniature high-performance modules, the lenses of camera modules have been formed of a plastic material lighter than glass, and optical imaging systems include five or more lenses to implement a high resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens sequentially arranged from an object side to an imaging plane. An angle of view of the optical system is 82 degrees or more. A constant indicating brightness of the optical system, F-number, is less than 1.8. The optical imaging system may satisfy the expression R1/f<0.42, where R1 represents a radius of curvature of an object-side surface of the first lens and f represents a total focal length of the optical system. The optical imaging system can satisfy the expression R4/f<0.65, where R4 represents a radius of curvature of an image-side surface of the second lens. The optical imaging system may satisfy the expression |f6|>25, where f6 represents a focal length of the sixth lens. The optical imaging system can satisfy the expression v2<21, where v2 represents an Abbe number of the second lens. The optical imaging system may satisfy the expression TTL/Imgh<0.69, were TTL represents a distance from an object-side surface of the first lens to an imaging plane of an image sensor and Imgh represents a diagonal length of the imaging plane of the image sensor. The optical imaging system can further include a stop disposed between the second lens and the third lens.

The first lens of the optical imaging system may have a positive refractive power, a convex object-side surface along an optical axis, and a concave image-side surface along the optical axis. The second lens of the optical imaging system can have a negative refractive power, a convex object-side surface along an optical axis, and a concave image-side surface along the optical axis. The third lens of the optical imaging system may have a positive refractive power, a convex object-side surface along an optical axis, and a concave image-side surface along the optical axis. Alternatively, the third lens of the optical imaging system can have a positive refractive power, a convex object-side surface along an optical axis, and a convex image-side surface along the optical axis.

The fourth lens of the optical imaging system may have a negative refractive power, a convex object-side surface along an optical axis, and a concave image-side surface along the optical axis. The fifth lens of the optical imaging system can have a positive or negative refractive power, a concave object-side surface along an optical axis, and a convex image-side surface along the optical axis. The sixth lens of the optical imaging system may have a positive or negative refractive power, a convex object-side surface along an optical axis, and a concave image-side surface along the optical axis.

In another general aspect, an optical imaging system includes a first lens, a second lens, a third lens, a fourth lens, a fifth lens, and a sixth lens sequentially arranged from an object side to an imaging side. An angle of view of the optical system is 82 degrees or more. A constant indicating brightness of the optical system, F-number, is less than 1.8. The expression R1/f<0.42 is satisfied, where R1 represents a radius of curvature of an object-side surface of the first lens and f represents a total focal length of the optical system. The expression R4/f<0.65 is also satisfied, where R4 represents a radius of curvature of an image-side surface of the second lens.

An Abbe number of the second lens may be less than 21.

Other features and aspects will be apparent from the following detailed description, the drawings, and the claims.

Throughout the drawings and the detailed description, the same reference numerals refer to the same elements, wherein applicable. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. The sequences of operations described herein are merely examples, and are not limited to those set forth herein, but may be changed as will be apparent after an understanding of the disclosure, with the exception of operations necessarily occurring in a certain order. Also, descriptions of functions and constructions that are well known may be omitted for increased clarity and conciseness.

The features described herein may be embodied in different forms, and should not be construed as being limited to the examples described herein. Rather, the examples described herein have been provided so that this disclosure will be thorough and complete, and will convey the full scope of the disclosure after an understanding of the application.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Subsequently, examples are described in further detail with reference to the accompanying drawings. Examples provide an optical imaging system in which a constant resolution may be implemented even in relatively low illumination intensity environments and by which a relatively wide angle of view may be provided. Examples provide an optical imaging system in which high resolution may be implemented while providing improved aberration correction effects.

In the lens configuration diagrams, the thickness, size, and shape of lenses as illustrated may be somewhat exaggerated for ease of explanation, and shapes of spherical or aspherical surfaces illustrated in the lens configuration diagrams are only provided by way of examples, and thus, are not limited thereto. Particularly, the shapes of spherical surfaces or aspherical surfaces illustrated in the drawings are illustrated by way of example. That is, the shapes of the spherical surfaces or the aspherical surfaces are not limited to those illustrated in the drawings.

Although terms such as "first," "second," and "third" may be used herein to describe various components, regions, or sections, these components, regions, or sections are not to be limited by these terms, unless otherwise specifically noted such as in the below instances. Rather, these terms are only used to distinguish one component, region, or section from another component, region, or section. Thus, a first component, region, or section referred to in examples described herein may also be referred to as a second component, region, or section without departing from the teachings of the examples. However, a first lens refers to a lens closest to an object, while a sixth lens refers to a lens closest to an image sensor. In the case of respective lenses, a first surface refers to a surface (or an object-side surface) closest to an object, and a second surface refers to a surface (or an image-side surface) closest to an imaging plane.

In accordance with illustrative examples, the embodiments described of the optical system include six lenses with a refractive power. However, the number of lenses in the optical system may vary in some embodiments, for example, between two to six lenses, while achieving one or more results and benefits described below. Also, although each lens is described with a particular refractive power, a different refractive power for at least one of the lenses may be used to achieve the intended result.

In the present specification, all of radii of curvature, thicknesses of lenses, and the like are provided in millimeters (mm), and the unit of angle of view of an optical imaging system (FOV) is 'degrees'. A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Likewise, thicknesses of lenses, gaps between the lenses, OALs, TLs, SLs are distances measured based on an optical axis of the lenses.

In addition, in descriptions of shapes of respective lenses, the meaning that one surface of a lens is convex is that a portion of a paraxial region of the surface is convex, and the meaning that one surface of a lens is concave is that a portion of a paraxial region of the surface is concave. Thus, even in the case that it is described that one surface of a lens is convex, an edge portion of the lens may be concave. Similarly, even in the case that it is described that one surface of a lens is concave, an edge portion of the lens may be convex. The paraxial region refers to a relatively narrow region in the vicinity of an optical axis. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

An optical imaging system according to an example includes six lenses. For example, an optical imaging system according to an example includes a first lens, a second lens, a third lens, a fourth lens, a fifth lens, and a sixth lens sequentially arranged from an object side to an imaging plane. However, an optical imaging system according to examples is not limited to only being configured of lenses, but may further include other components.

For example, the optical imaging system may further include an image sensor converting an image of an incident subject into an electric signal. In addition, the optical imaging system may further include an infrared filter blocking infrared light. The infrared filter may be disposed between the sixth lens and the image sensor. The optical imaging system may further include a stop adjusting an amount of light. For example, the stop may be disposed between the second lens and the third lens.

The first to sixth lenses configuring the optical imaging system according to an example may be formed of a plastic material. At least one lens of the first to sixth lenses has an aspherical surface. In addition, each of the first to sixth lenses has at least one aspherical surface. For example, one or both of first and second surfaces of each of the first to sixth lenses may have an aspherical surface. In this case, the aspherical surfaces of the first to sixth lenses are represented by Equation (1).

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 1]}$$

In Equation 1, c represents an inverse number of a radius of curvature of a lens, k represents a conic constant, and Y indicates a distance from a certain point on an aspherical surface to an optical axis. In addition, constants A to F refer to aspherical coefficients, and Z indicates a distance between a certain point on an aspherical surface of a lens to an apex of the aspherical surface.

The optical imaging system comprised of the first to sixth lenses may respectively have a positive, a negative, a positive, a negative, a negative, and a positive power or a positive, a negative, a positive, a negative, a positive, and a negative refractive power, sequentially from an object side to an imaging plane.

The optical imaging system according to one or more examples satisfies the following conditional expressions:

| | |
|---|---|
| $F$-number<1.8 | [Conditional Expression 1] |
| $FOV>82°$ | [Conditional Expression 2] |
| $R1/f<0.42$ | [Conditional Expression 3] |
| $R4/f<0.65$ | [Conditional Expression 4] |
| $|f6|>25$ | [Conditional Expression 5] |
| $v2<21$ | [Conditional Expression 6] |
| $TTL/\text{Imgh}<0.69$ | [Conditional Expression 7] |

In the conditional expressions, F-number represents a constant indicating brightness of the optical imaging system, FOV represents an angle of view of the optical imaging system, R1 represents a radius of curvature of an object-side surface of a first lens, f represents a total focal length of the optical imaging system, R4 represents a radius of curvature of an image-side surface of a second lens, f6 represents a focal length of a sixth lens, V2 represents an Abbe number of the second lens, TTL represents a distance from the object-side surface of the first lens to an imaging plane of an image sensor, and Imgh represents a diagonal length of the imaging plane of the image sensor.

Hereinafter, the first to sixth lenses constituting the optical imaging system according to an example will be described. The first lens has a positive refractive power. In addition, the first lens may have a meniscus shape, convex toward an object. In an embodiment, a first surface of the first lens is convex in a paraxial region, and a second surface is concave in the paraxial region. In the case of the first lens, at least one surface of the first surface and the second surface may be aspherical. For example, both surfaces of the first lens are aspherical.

The second lens has a negative refractive power. In addition, the second lens may have a meniscus shape, convex toward the object. In an embodiment, a first surface of the second lens is convex in a paraxial region, and a second surface is concave in the paraxial region. In the case of the second lens, at least one of the first surface and the second surface may be aspherical. For example, both surfaces of the second lens are aspherical.

The third lens has a positive refractive power. In addition, the third lens may have a meniscus shape convex toward the object. In an embodiment, a first surface of the third lens is convex in a paraxial region, and a second surface is concave in the paraxial region. In another embodiment, the third lens may have a shape in which two surfaces are convex. For example, the first surface and the second surface of the third lens are convex in the paraxial region. In the case of the third lens, at least one of the first surface and the second surface may be aspherical. For example, both surfaces of the third lens are aspherical.

The fourth lens has a negative refractive power. In addition, the fourth lens may have a meniscus shape convex toward the object. For example, a first surface of the fourth lens is convex in a paraxial region, and a second surface is concave in the paraxial region. In the case of the fourth lens, at least one of the first surface and the second surface may be aspherical. In an embodiment, both surfaces of the fourth lens are aspherical.

The fifth lens has a positive or negative refractive power. In addition, the fifth lens may have a meniscus shape, convex toward the image sensor. For example, a first surface of the fifth lens is concave in a paraxial region, and a second surface is convex in the paraxial region. In the case of the fifth lens, at least one of the first surface and the second surface may be aspherical. In an embodiment, both surfaces of the fifth lens are aspherical.

The sixth lens has a positive or negative refractive power. In addition, the sixth lens may have a meniscus shape, convex toward the object. For example, a first surface of the sixth lens is convex in a paraxial region, and a second surface is concave in the paraxial region. In the case of the sixth lens, at least one of the first surface and the second surface may be aspherical. In an embodiment, both surfaces of the sixth lens are aspherical.

In addition, the sixth lens may have at least one inflection point formed on one or both of the first and second surfaces.

For example, the first surface of the sixth lens has a shape convex in the paraxial region, but concave toward an edge of the lens. The second surface of the sixth lens has a shape concave in the paraxial region, but convex toward an edge of the lens.

In the optical imaging system configured as described above, because a plurality of lenses perform an aberration correction function, aberration correction performance is improved. Further, because the optical imaging system has an F-number of 1.8 or less, an image of an object may be clearly captured even in relatively low illumination intensity environments, where F-number is a constant indicating a degree of brightness of the optical imaging system. The optical imaging system has wide-angle lens characteristics in which an angle of view (FOV) is 82 degrees or more. Thus, zoom magnification may be significantly increased in the case that the optical imaging system is used together with another optical imaging system, such as a telescopic lens having a relatively narrow angle of view.

An optical imaging system according to a first example will be described with reference to FIGS. 1 to 4. The optical imaging system according to the first example includes a first lens 110, a second lens 120, a third lens 130, a fourth lens 140, a fifth lens 150, and a sixth lens 160. The optical imaging system according to the first example may further include a stop, an infrared light blocking filter 170, and an image sensor 180. Lens characteristics of respective lenses, such as a radius of curvature, a lens thickness, a distance between lenses, a refractive index, an Abbe number, are listed in the table of FIG. 3.

Figure 1:
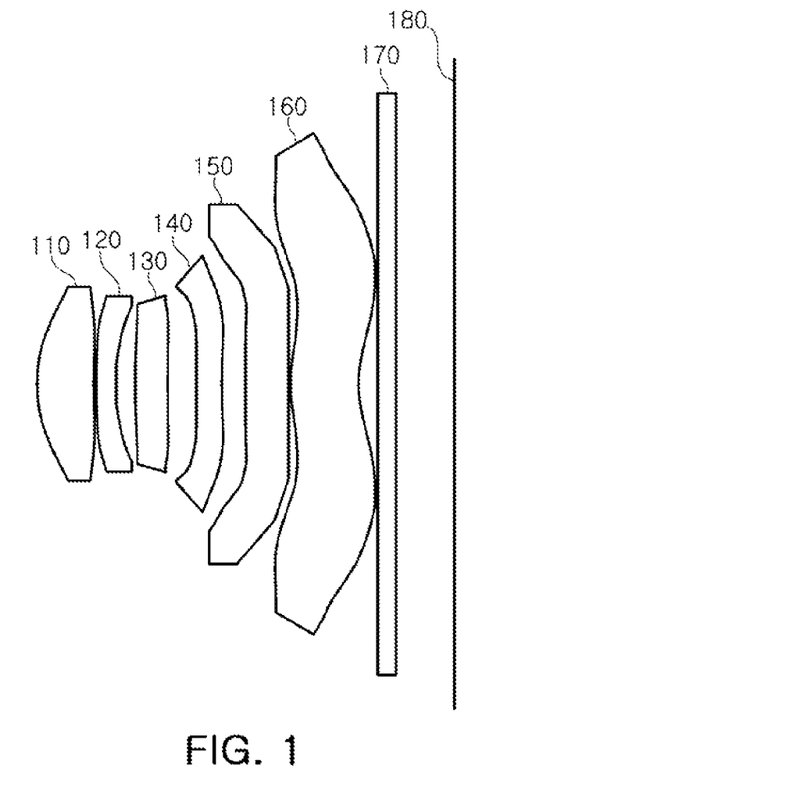
FIG. 1 is a lens configuration diagram illustrating an optical imaging system according to a first example.
Figure 2:
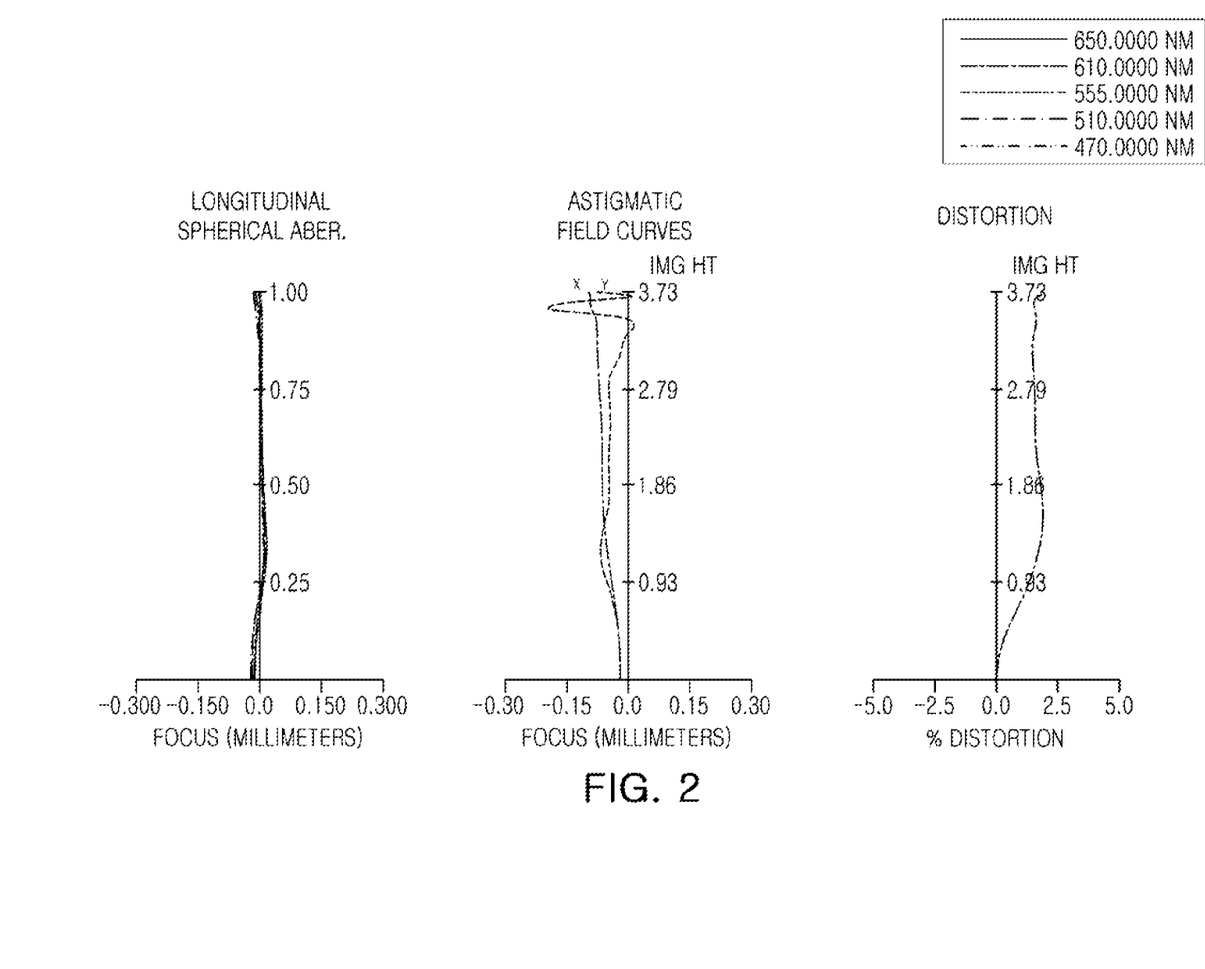
FIG. 2 is a set of graphs containing curves illustrating aberration characteristics of the optical imaging system illustrated in FIG. 1.
Figure 3:
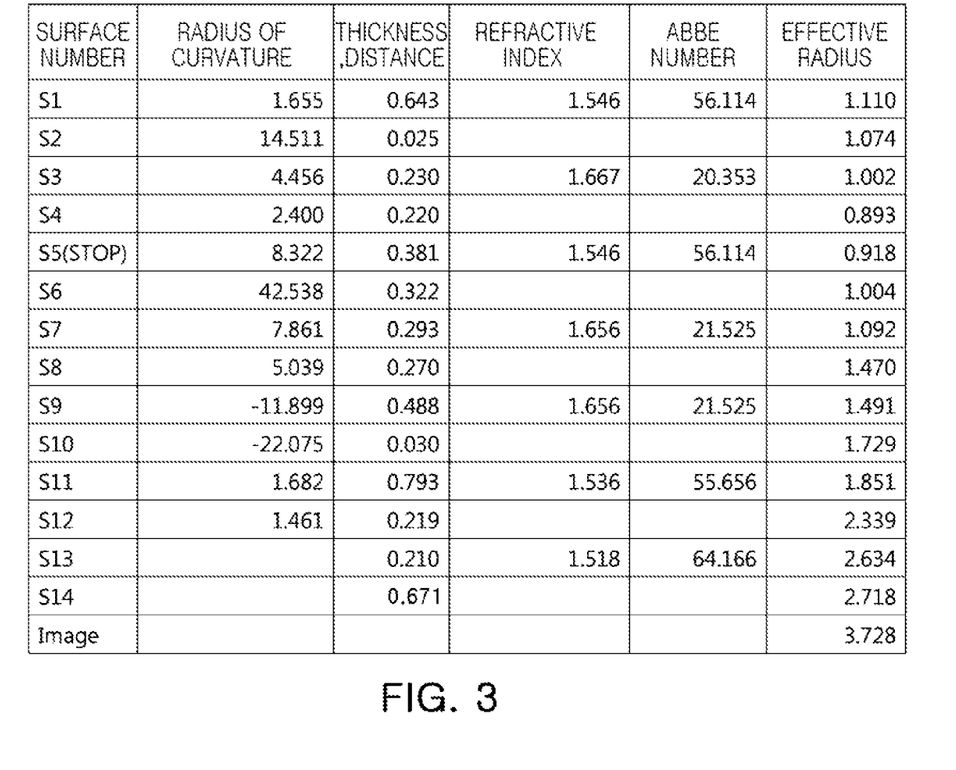
FIG. 3 is a table listing lens characteristics of the optical imaging system illustrated in FIG. 1.

In the first example, first lens 110 has a positive refractive power, the first surface of first lens 110 is convex in the paraxial region, and the second surface of first lens 110 is concave in the paraxial region. The second lens 120 has a negative refractive power, the first surface of second lens 120 is convex in the paraxial region, and the second surface of second lens 120 is concave in the paraxial region. The third lens 130 has a positive refractive power, the first surface of third lens 130 is convex in the paraxial region, and the second surface of third lens 130 is concave in the paraxial region.

The fourth lens 140 has a negative refractive power, the first surface of fourth lens 140 is convex in the paraxial region, and the second surface of fourth lens 140 is concave in the paraxial region. The fifth lens 150 has a negative refractive power, the first surface of fifth lens 150 is concave in the paraxial region, and the second surface of fifth lens 150 is convex in the paraxial region. The sixth lens 160 has a positive refractive power, the first surface of sixth lens 160 is convex in the paraxial region, and the second surface of sixth lens 160 is concave in the paraxial region. In addition, sixth lens 160 has at least one inflection point on one or both of the first surface and the second surface.

Figure 4:
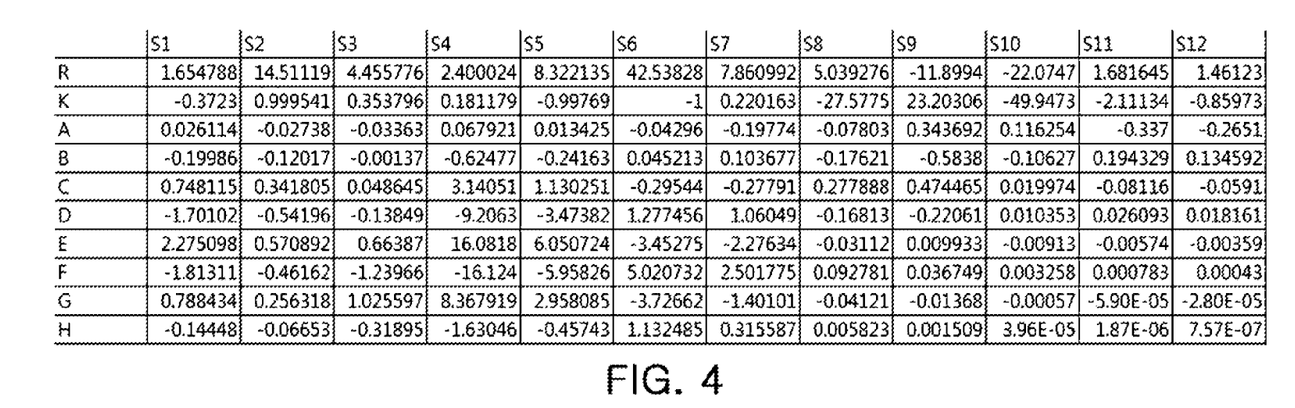
FIG. 4 is a table listing aspherical coefficients of lenses of the optical imaging system illustrated in FIG. 1.

Respective surfaces of first to sixth lenses 110 to 160 have aspherical coefficients as listed in FIG. 4. For example, all of object-side surfaces and image-side surfaces of first to sixth lenses 110 to 160 are aspherical surfaces. Optionally, the stop may be disposed between second lens 120 and third lens 130. The optical imaging system configured as described above has aberration characteristics as illustrated by the graphs in FIG. 2.

With reference to FIGS. 5 to 8, an optical imaging system according to a second example will be described below. The optical imaging system according to the second example includes a first lens 210, a second lens 220, a third lens 230, a fourth lens 240, a fifth lens 250, and a sixth lens 260. The optical imaging system according to the second example may further include a stop, an infrared light blocking filter 270, and an image sensor 280. Lens characteristics of respective lenses, such as a radius of curvature, a lens thickness, a distance between lenses, a refractive index, an Abbe number, are listed in the table of FIG. 7.

Figure 5:
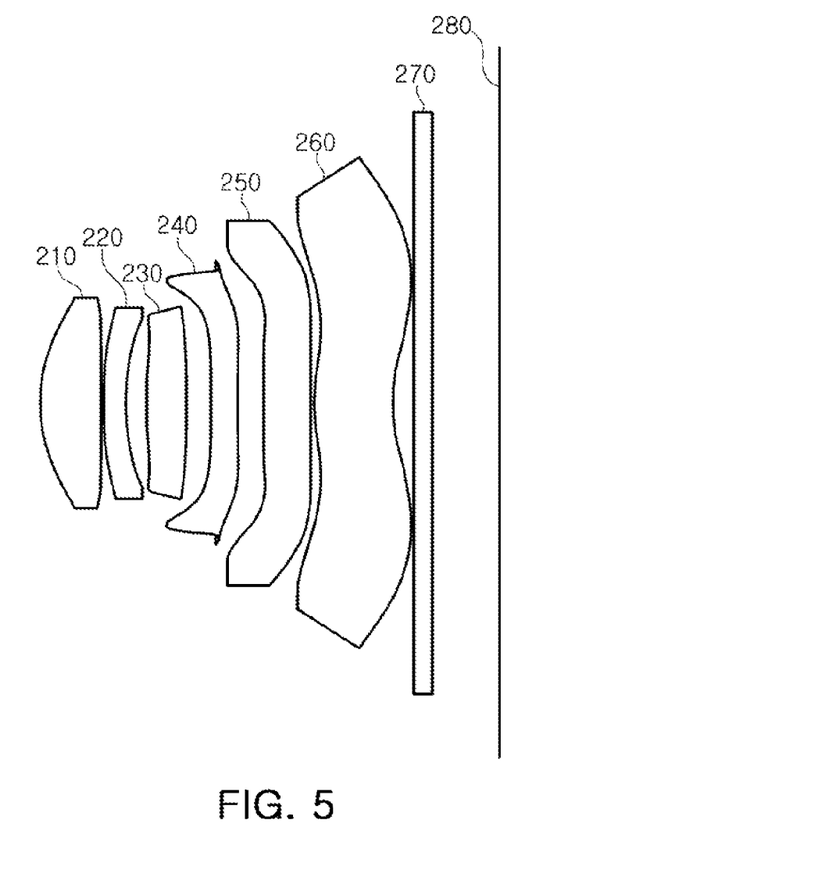
FIG. 5 is a lens configuration diagram of an optical imaging system according to a second example.
Figure 6:
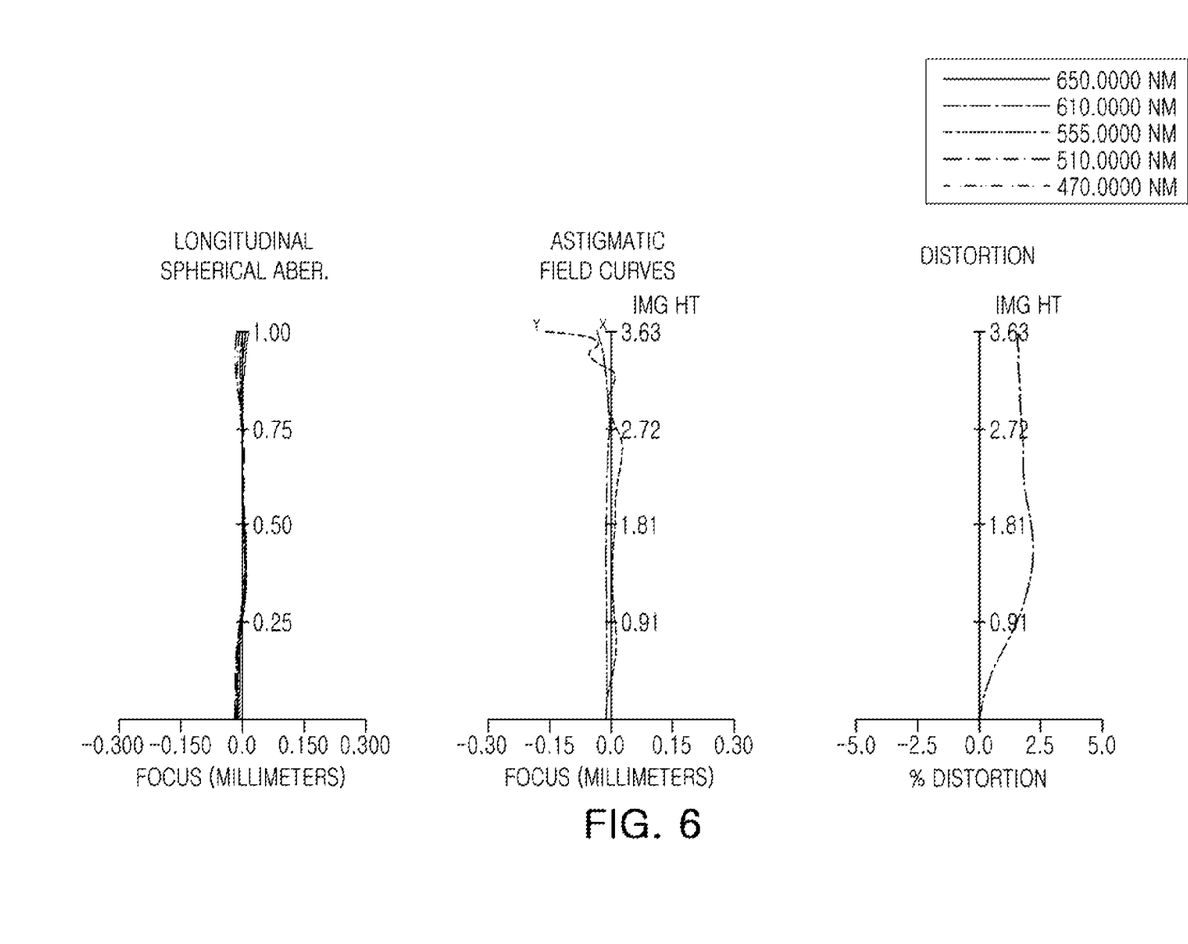
FIG. 6 is a set of graphs containing curves illustrating aberration characteristics of the optical imaging system illustrated in FIG. 5.
Figure 7:
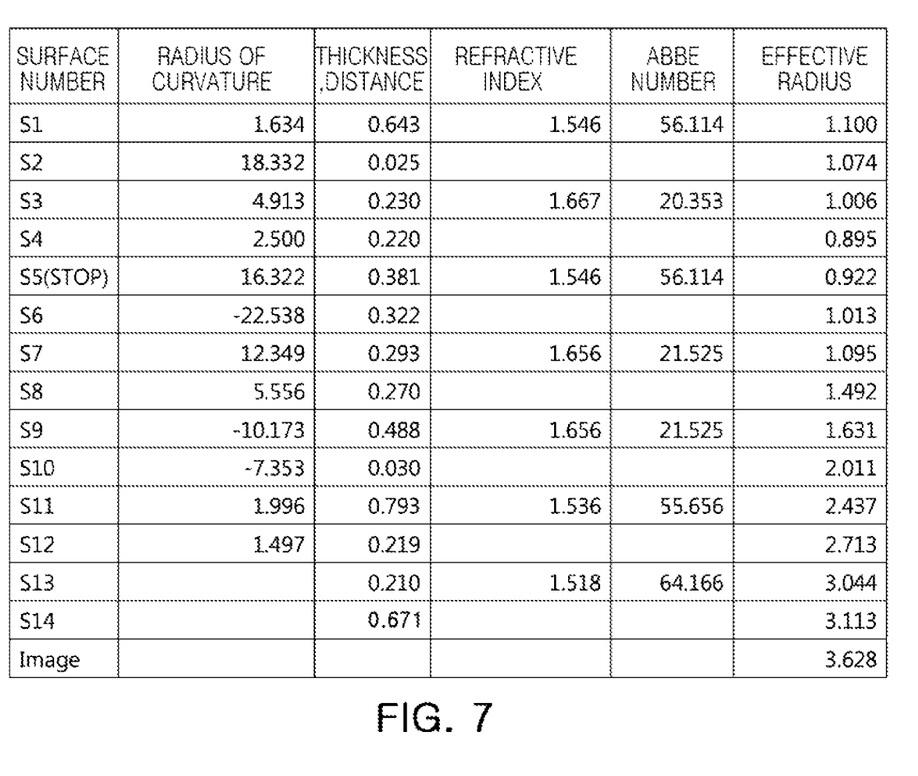
FIG. 7 is a table listing lens characteristics of the optical imaging system illustrated in FIG. 5.

In the second example, first lens 210 has a positive refractive power, a first surface of first lens 210 is convex in the paraxial region, and a second surface of first lens 210 is concave in the paraxial region. The second lens 220 has a negative refractive power, a first surface of second lens 220 is convex in the paraxial region, and a second surface of second lens 220 is concave in the paraxial region. The third lens 230 has a positive refractive power, and first and second surfaces of the third lens 230 are convex in a paraxial region.

The fourth lens 240 has a negative refractive power, a first surface of fourth lens 240 is convex in a paraxial region, and a second surface of fourth lens 240 is concave in the paraxial region. The fifth lens 250 has a positive refractive power, a first surface of fifth lens 250 is concave in a paraxial region, and a second surface of fifth lens 250 is convex in the paraxial region. The sixth lens 260 has a negative refractive power, a first surface of sixth lens 260 is convex in a paraxial region, and a second surface of sixth lens 260 is concave in the paraxial region. In addition, sixth lens 260 has at least one inflection point on one or both of the first surface and the second surface.

Figure 8:
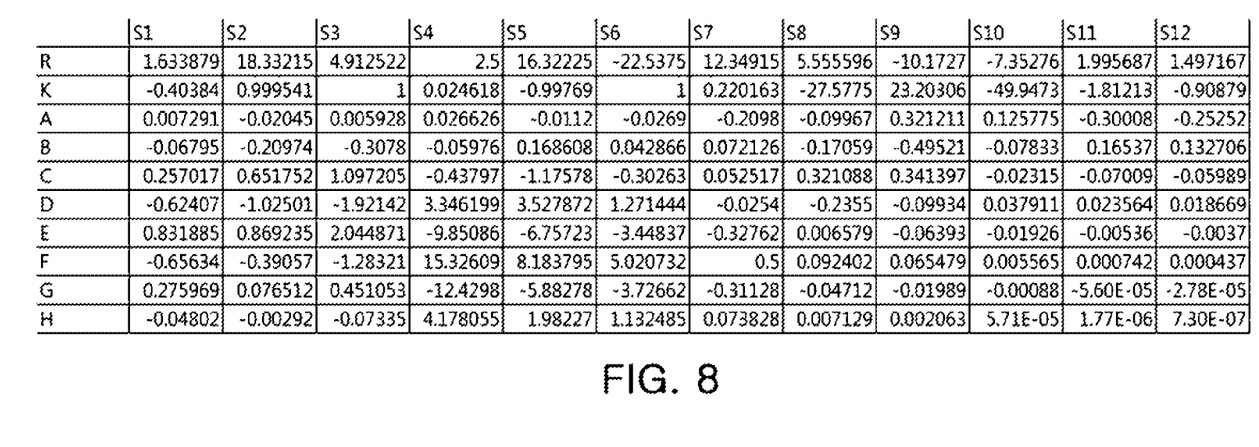
FIG. 8 is a table listing aspherical coefficients of lenses of the optical imaging system illustrated in FIG. 5.

Respective surfaces of first to sixth lenses 210 to 260 have aspherical coefficients as listed in FIG. 8. For example, all of object-side surfaces and image-side surfaces of first to sixth lenses 210 to 260 are aspherical surfaces. Optionally, the stop may be disposed between second lens 220 and third lens 230. The optical imaging system configured as described above has aberration characteristics as illustrated by the graphs in FIG. 6.

With reference to FIGS. 9 to 12, an optical imaging system according to a third example will be described below. The optical imaging system according to the third example includes a first lens 310, a second lens 320, a third lens 330, a fourth lens 340, a fifth lens 350, and a sixth lens 360. The optical imaging system according to the third example may further include a stop, an infrared light blocking filter 370, and an image sensor 380. Lens characteristics of respective lenses, such as a radius of curvature, a lens thickness, a distance between lenses, a refractive index, an Abbe number, are listed in the table of FIG. 11.

Figure 9:
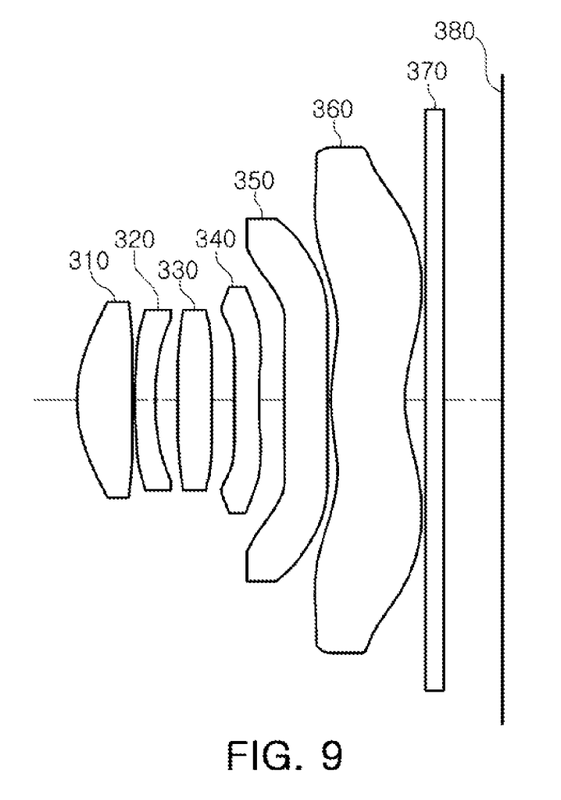
FIG. 9 is a lens configuration diagram of an optical imaging system according to a third example.
Figure 10:
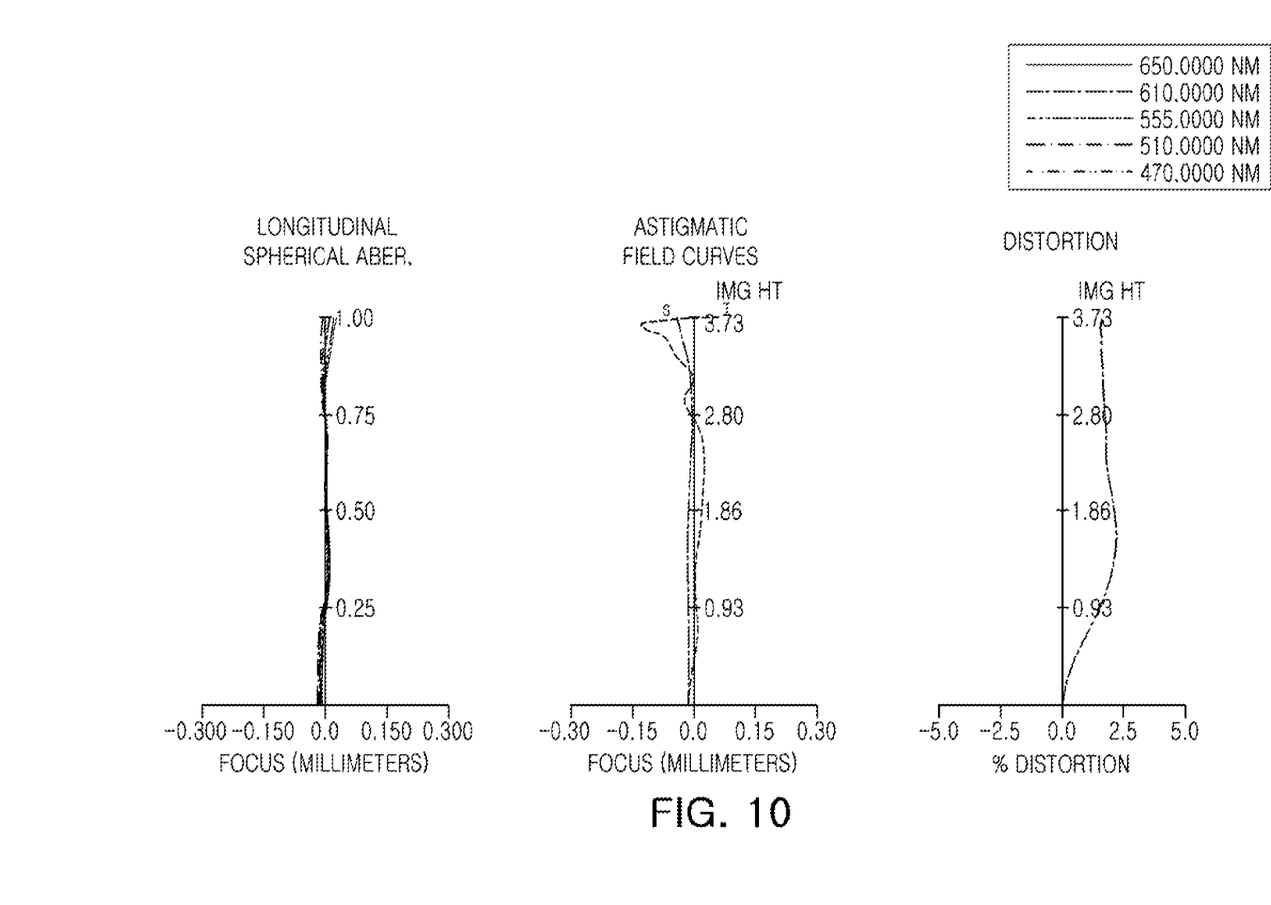
FIG. 10 is a set of graphs containing curves illustrating aberration characteristics of the optical imaging system illustrated in FIG. 9.
Figure 11:
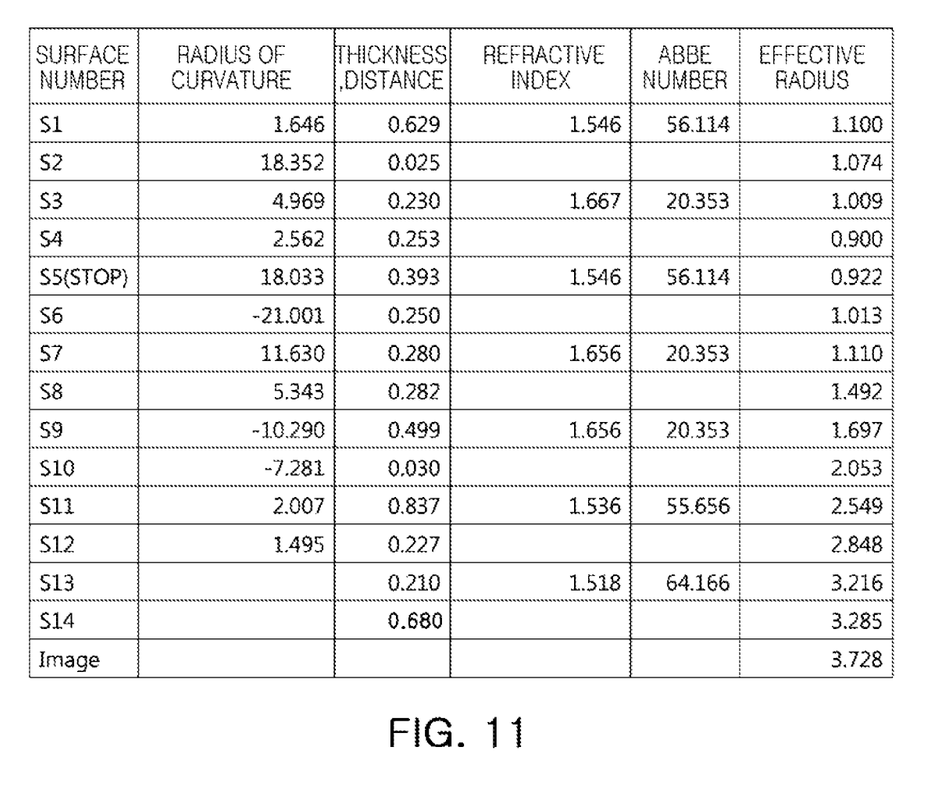
FIG. 11 is a table listing lens characteristics of the optical imaging system illustrated in FIG. 9.

In the third example, first lens 310 has a positive refractive power, a first surface of first lens 310 is convex in the paraxial region, and a second surface of first lens 310 is concave in the paraxial region. The second lens 320 has a negative refractive power, a first surface of second lens 320 is convex in the paraxial region, and a second surface of second lens 320 is concave in the paraxial region. The third lens 330 has a positive refractive power, and first and second surfaces of the third lens 330 are convex in a paraxial region.

The fourth lens 340 has a negative refractive power, a first surface of fourth lens 340 is convex in a paraxial region, and a second surface of fourth lens 340 is concave in the paraxial region. The fifth lens 350 has a positive refractive power, a first surface of fifth lens 350 is concave in a paraxial region, and a second surface of fifth lens 350 is convex in the paraxial region. The sixth lens 360 has a negative refractive power, a first surface of sixth lens 360 is convex in a paraxial region, and a second surface of sixth lens 360 is concave in the paraxial region. In addition, sixth lens 360 has at least one inflection point on one or both of the first surface and the second surface.

Figure 12:
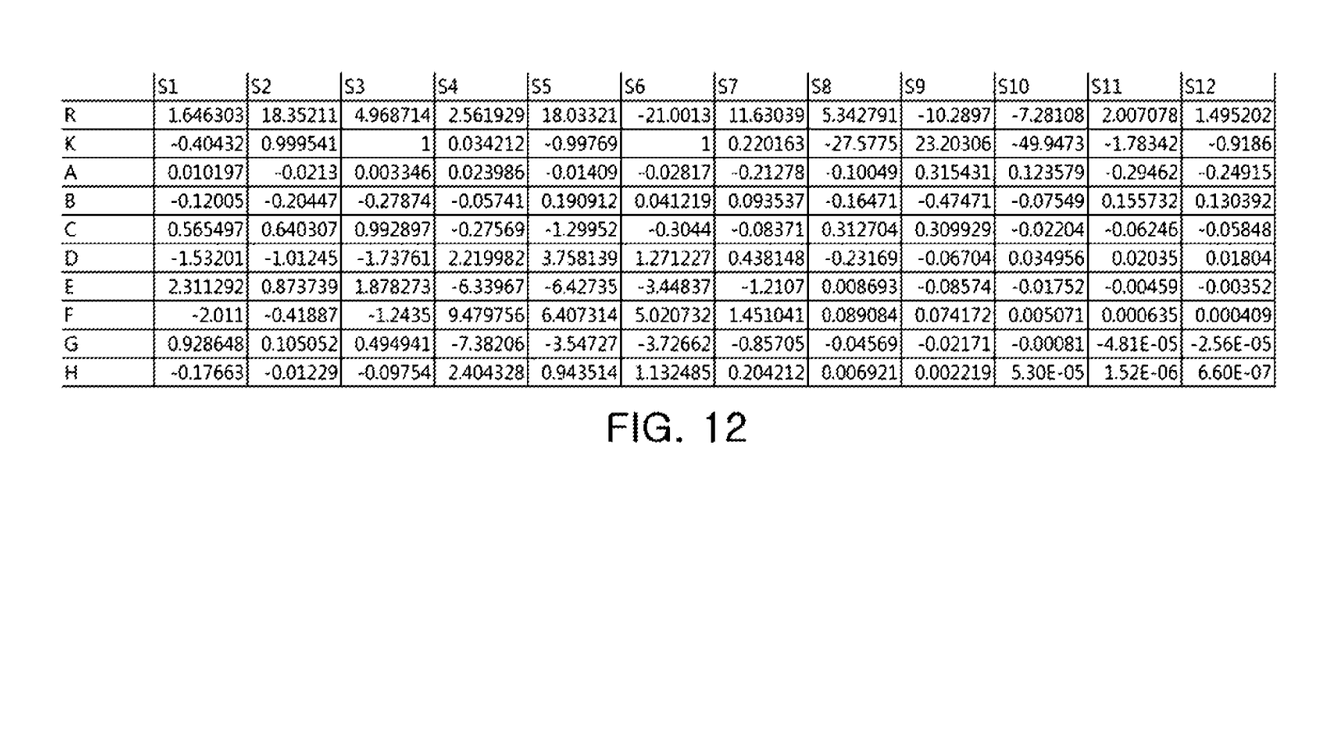
FIG. 12 is a table listing aspherical coefficients of lenses of the optical imaging system illustrated in FIG. 9.

Respective surfaces of first to sixth lenses 310 to 360 have aspherical coefficients as listed in FIG. 12. For example, all of object-side surfaces and image-side surfaces of first to sixth lenses 310 to 360 are aspherical surfaces. Optionally, the stop may be disposed between second lens 320 and third lens 330. The optical imaging system configured as described above has aberration characteristics as listed in FIG. 10.

TABLE 1

|  | First Example | Second Example | Third Example |
| --- | --- | --- | --- |
| Fno | 1.79 | 1.79 | 1.79 |
| TTL | 4.79 | 4.82 | 4.83 |
| SL | 3.676 | 3.676 | 3.688 |
| Imgh | 7.456 | 7.256 | 7.456 |
| FOV | 85.4 | 84.0 | 85.6 |
| R1 | 1.655 | 1.634 | 1.646 |
| R4 | 2.400 | 2.500 | 2.562 |
| f | 3.948 | 3.952 | 3.952 |
| f1 | 3.362 | 3.242 | 3.269 |
| f2 | −8.165 | −7.936 | −8.246 |
| f3 | 18.877 | 17.404 | 17.835 |
| f4 | −22.327 | −15.396 | −15.342 |
| f5 | −40.130 | 37.803 | 35.637 |
| f6 | 81.362 | −26.552 | −25.479 |
| v2 | 20.353 | 20.353 | 20.353 |

In Table 1, Fno represents a constant indicating brightness of the optical imaging system, TTL represents a distance from the object-side surface of the first lens to an imaging plane of the image sensor, SL represents a distance from the stop to the imaging plane of the image sensor, Imgh represents a diagonal length of the imaging plane of the image sensor, and FOV represents an angle of view of the optical imaging system. Alsop in Table 1, R1 represents a radius of curvature of the object-side surface of the first lens, R4 represents a radius of curvature of the image-side surface of the second lens, f represents a total focal length of the optical imaging system, f1 represents a focal length of the first lens, f2 represents a focal length of the second lens, f3 represents a focal length of the third lens, f4 represents a focal length of the fourth lens, f5 represents a focal length of the fifth lens, f6 represents a focal length of the sixth lens, and v2 represents an Abbe number of the second lens.

As set forth above, in the case of an optical imaging system according to an example, a constant resolution may be implemented even in relatively low illumination intensity environments. Moreover, a relatively wide angle of view may be provided according to the examples. In addition, a high resolution may be implemented while providing improved aberration correction effects.

While this disclosure includes specific examples, it will be apparent after an understanding of the application that various changes in form and details may be made in these examples without departing from the spirit and scope of the claims and their equivalents. The examples described herein are to be considered in a descriptive sense only, and not for purposes of limitation.

Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having positive refractive power, a convex object-side surface and a concave image-side surface;
a second lens having negative refractive power, a convex object-side surface and a concave image-side surface;
a third lens having positive refractive power;
a fourth lens having negative refractive power;
a fifth lens having refractive power; and
a sixth lens having refractive power,
wherein TTL/IMGH<0.69, where TTL represents a distance on an optical axis from an object-side surface of the first lens to an imaging plane of an image sensor, and IMGH represents a diagonal length of the imaging plane of the image sensor.

2. The optical imaging system of claim 1, wherein a constant indicating brightness of the optical imaging system, F-number, is less than 1.8.

3. The optical imaging system of claim 1, wherein an angle of view of the optical imaging system is 82 degrees or more.

4. The optical imaging system of claim 1, wherein R1/f<0.42, where R1 represents a radius of curvature of the object-side surface of the first lens and f represents a total focal length of the optical imaging system.

5. The optical imaging system of claim 1, wherein R4/f<0.65, wherein R4 represents a radius of curvature of the image-side surface of the second lens and f represents a total focal length of the optical system.

6. The optical imaging system of claim 1, wherein |f6|>25 mm, where f6 represents a focal length of the sixth lens.

7. The optical imaging system of claim 1, wherein v2<21, where v2 represents an Abbe number of the second lens.

8. The optical imaging system of claim 1, wherein the third lens has a convex object-side surface along the optical axis.

9. The optical imaging system of claim 8, wherein the third lens has a concave image-side surface along the optical axis.

10. The optical imaging system of claim 1, wherein the fourth lens has a convex object-side surface along the optical axis, and a concave image-side surface along the optical axis.

11. The optical imaging system of claim 1, wherein the fifth lens has a convex image-side surface along the optical axis.

12. The optical imaging system of claim 11, wherein the fifth lens has positive refractive power.

13. The optical imaging system of claim 1, wherein the sixth lens has a concave image-side surface along the optical axis.

14. The optical imaging system of claim 13, wherein the sixth lens has negative refractive power.

* * * * *